US011976339B2

United States Patent

Trevino Cantu et al.

(12) United States Patent
(10) Patent No.: US 11,976,339 B2
(45) Date of Patent: May 7, 2024

(54) **METHOD FOR PRODUCING SUSTAINABLE LEATHER USING BY-PRODUCTS FROM PARTS OF ALL VARIETIES AND SPECIES OF THE GENUS *PERSEA* PLANT INCLUDING AMONG THEM BOTH THE AMERICAN SPECIES AND THE HASS VARIETY AS WELL**

(71) Applicant: CURTIDOS TREVINO, S.A. DE C.V., Nuevo Leon el Carmen (MX)

(72) Inventors: Leonelo Trevino Cantu, Nuevo Leon el Carmen (MX); Gerardo Trevino Cantu, Nuevo Leon el Carmen (MX)

(73) Assignee: CURTIDOS TREVINO, S.A. DE C.V., Nuevo Leon (MX)

( * ) Notice: Subject to any disclaimer, the term of this patent is extended or adjusted under 35 U.S.C. 154(b) by 179 days.

(21) Appl. No.: 17/627,235

(22) PCT Filed: Jul. 15, 2020

(86) PCT No.: PCT/MX2020/050019

§ 371 (c)(1),
(2) Date: Jan. 14, 2022

(87) PCT Pub. No.: WO2021/010815

PCT Pub. Date: Jan. 21, 2021

(65) Prior Publication Data

US 2022/0259683 A1 Aug. 18, 2022

Related U.S. Application Data

(60) Provisional application No. 62/874,602, filed on Jul. 16, 2019.

(51) Int. Cl.
*C14C 3/00* (2006.01)
*C14C 3/12* (2006.01)
*C14C 9/04* (2006.01)
*D06P 3/32* (2006.01)

(52) U.S. Cl.
CPC .................. *C14C 3/12* (2013.01); *C14C 9/04* (2013.01); *D06P 3/32* (2013.01)

(58) Field of Classification Search
CPC .... C14C 3/12; C14C 9/04; C14C 3/14; C14C 3/28; C14C 3/10; D06P 3/32
USPC ........................................................ 8/94.19 R
See application file for complete search history.

(56) References Cited

FOREIGN PATENT DOCUMENTS

| | | | |
|---|---|---|---|
| CN | 109207654 | A | 1/2019 |
| EP | 2862944 | A1 | 4/2015 |

OTHER PUBLICATIONS

Extraction of oil and phenolic retanning agent from Avocado seeds (Jan. 23, 2019).*

(Continued)

*Primary Examiner* — Eisa B Elhilo
(74) *Attorney, Agent, or Firm* — Workman Nydegger

(57) ABSTRACT

A method is provided for producing sustainable leather using by-products from parts of all varieties and species of the plant genus *Persea* including among them both the American species and the Hass variety. A hide or leather may be produced by the method, and a method is provided for producing the natural tanning agents used in the method to produce sustainable leather and the natural tanning agents produced by the method.

13 Claims, 2 Drawing Sheets

(56) References Cited

OTHER PUBLICATIONS

International Search Report and Written Opinion from corresponding Mexican Application No. PCT/MX2020/050019, Dec. 3, 2020.

* cited by examiner

METHOD FOR PRODUCING SUSTAINABLE LEATHER USING BY-PRODUCTS FROM PARTS OF ALL VARIETIES AND SPECIES OF THE GENUS *PERSEA* PLANT INCLUDING AMONG THEM BOTH THE AMERICAN SPECIES AND THE HASS VARIETY AS WELL

BACKGROUND OF THE INVENTION

Field of the Invention

The present invention relates to vegetable tanning methods, and more particularly to a method for producing a sustainable leather free of chromium, free of heavy metals and benzidine dyes, using several vegan by-products from the *Persea* genus plant.

Description of Related Art

The tanning of hides and skins is one of the oldest processes of mankind. There are several types of tanning, among them, the most known and used are vegetable tanning, which uses only tannins, and vegetable tanning, which uses only tannins, and vegetable tanning, which uses only tannins, and chrome tanning, which may include the use of tannin in some stages of processing.

Vegetable tanning has several advantages over chrome tanning, such as: vegetable tanning is more environmentally friendly as it does not use chrome or heavy metals, which means that it produces a hide or leather that can be recycled, and the colors produced by vegetable tanning are rich, warm tones that look natural.

The raw materials used for vegetable tanning are natural tannins, available in liquid or powder form, which are obtained from various parts of plants such as wood, bark, fruit, pods, and leaves.

Therefore, it is desirable to use vegetable raw materials that are abundantly available and economical such as fruits in a vegetable tanning method.

The plant genus *Persea* and its many species are used primarily as one of the most nutritious foods that have ever existed in the world; it is a plant with an abundant content of oils, tannins, and antioxidants and that proliferates relatively easily. In Mexico alone 2,029,886 tons of avocado were produced in 2017.

Due to the large amount of avocado produced, not all of the production is consumed and every year thousands of tons of avocado are dumped in landfills around the world, which generates greenhouse gases as it decomposes.

Therefore, avocado comprises an ideal raw material that could be exploited in a vegetable tanning method.

In view of the above, the applicant developed a vegetable tanning method specially designed to take advantage of the use of avocado and seed of the genus *Persea*, in any variety of species, as raw material, preferably by-products of the food industry.

The basic raw materials of the method of the present invention are raw hides and skins of cattle, goats, and others, of all ages and various breeds, and a natural tanning agent obtained from the seed, pulp, and crust (peel) of the avocado genus *Persea*, for which the applicant developed a specific method to obtain it.

The final product can be used to manufacture leather seats for automobiles, airplanes, boats and any type of vehicle, all types of shoes, boots, handbags, briefcases, leather goods, computer components and their cases and accessories, living rooms, and sofas, chairs, belts and garments to be identified as hides and skins with a sustainable and environmentally friendly tanning process that starts with renewable materials such as avocado *Persea* genus and general livestock hides and skins that are existing by-products derived from the food industry.

The hide and leather produced by means of the method of the present invention is sustainable, free of chromium, free of heavy metals and benzidine dyes.

SUMMARY OF THE INVENTION

It is therefore a main objective of the present invention, to provide a vegetable tanning method especially designed to benefit from using as raw material, avocado and seed of the *Persea* genus in any variety of species, preferably by-products of the food industry.

Another main purpose of the present invention is to provide a tanning method of the above-described nature, which uses as basic raw materials raw hides and skins from cattle, goats, and others, of all ages and various breeds, and a natural tanning agent obtained from the seed, pulp, and peel of the avocado genus *Persea.*

It is an additional purpose of the present invention to provide a natural tanning agent obtained from the seed, pulp, and rind (peel) of the avocado genus *Persea* and the method for its preparation.

It is yet an additional purpose of the present invention, to provide a skin or leather produced by means of the vegetable tanning method of the present invention, which are sustainable, free of chromium, free of heavy metals and benzidine dyes.

These and other objectives and advantages of the present invention will become evident to persons having ordinary skill in the trade by means of the following detailed description of the invention.

DETAILED DESCRIPTION OF THE INVENTION

The method of the present invention uses as raw material raw hides and skins from cattle, goats, and others, of all ages and various breeds, and avocados and seeds of the genus *Persea* in any variety of species, preferably by-products of the food industry, which upon receipt from the supplier were stabilized at room temperature (preferably 25° C.) for 24 hours. Subsequently, the seeds were washed before being used in the method of the present invention.

Figure 1:
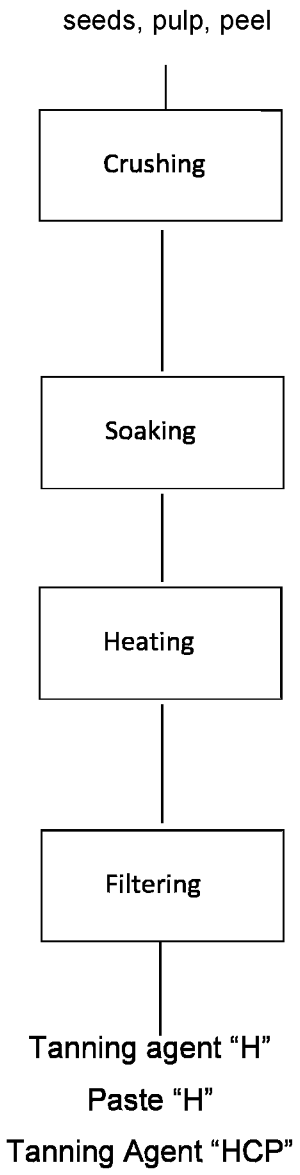
FIG. 1 comprises a block diagram depicting the stages of the method for producing “Tanning H”, “Paste H” and “HCP Tanning”.

The method of the present invention will now be described in relation to a preferred mode thereof, wherein the method for producing sustainable leather of the present invention comprises the following stages:

Preparation of the Natural Tanning Agent (FIG. 1).

Production of “Tanning H”.

a) Crush the seeds of avocados genus *Persea* at any stage of maturation and in any quantity by means of a mill, until achieving a particle size equal to or less than 5 mm;

b) Soak the crushed seeds of *Persea* avocados obtained in step a) in an open reactor under agitation by any suitable means in a proportion of 10 to 30% of the seed and 70 to 90% of water (percentages in base weight);

c) Heat the product from step b) in the open reactor by means of water steam, at a temperature between 60 and 100° C. for a time between approximately 15 minutes and up to 12 hours;

d) Filter the product from step c) through rapid filtration filters having a sieve size between 100 to 500 microns to obtain: a filtered liquid called "tanning agent H", which is orange color and is derived from the seed of avocado trees of the "*Persea*" genus;

Production of "Paste H".

e) Recover from the filtering stage d) a paste called "paste H" which has an orange coloration, which is the solid resulting from the filtering operation d) derived only from the seed of avocados genus *Persea*.

Production of "HCP Tanning Agent"

f) Grind the seeds, pulp, and peel of all the avocados of the *Persea* genus that fell from the trees by means of a mill, without having reached the degree of maturation required by the food industry in a proportion of 10 to 30% and 70 to 90% of water (percentages in base weight) until a particle size equal to or less than 5 mm is achieved.

The number of seeds to be crushed is preferably, at most, similar to the number of seeds crushed in step a).

g) Soak the crushed seed, pulp, and peel of avocados genus *Persea* obtained in step f) in an open reactor under agitation by any suitable means, in a proportion of 10 to 30% of the crushed seed, pulp and peel and 70 to 90% of water (percentages in base weight);

h) Heat the product of step g) in the open reactor by means of water steam, at a temperature between 60 and 100° C. for a time between approximately 15 minutes and up to 12 hours;

i) Filter the product from step h) through rapid filtration filters with a sieve size between 100 to 500 microns to obtain: a filtered liquid called "HCP tanning agent" which is derived from the seed, pulp, and peel of all the avocados of the "*Persea*" genus that fell from the trees without having reached the degree of maturation required by the food industry;

Production of "AL50 OIL"

j) An AL50 OIL was prepared by mixing in an open reactor 5% to 50% in weight (preferably 25% in weight) of 100% pure *Persea* oil with 75% to 80% water and 5% to 25% of at least one anionic-type emulsifier (any), under constant stirring at a temperature of 40 to 80 degrees Celsius (percentage by base weight) for a time of preferably between 5 to 30 minutes. The amount by weight of AL50 OIL to be prepared is preferably, at most, the same amount by weight prepared of the "tanning agent H", the "paste H" and the "tanning agent HCP".

Figure 2:
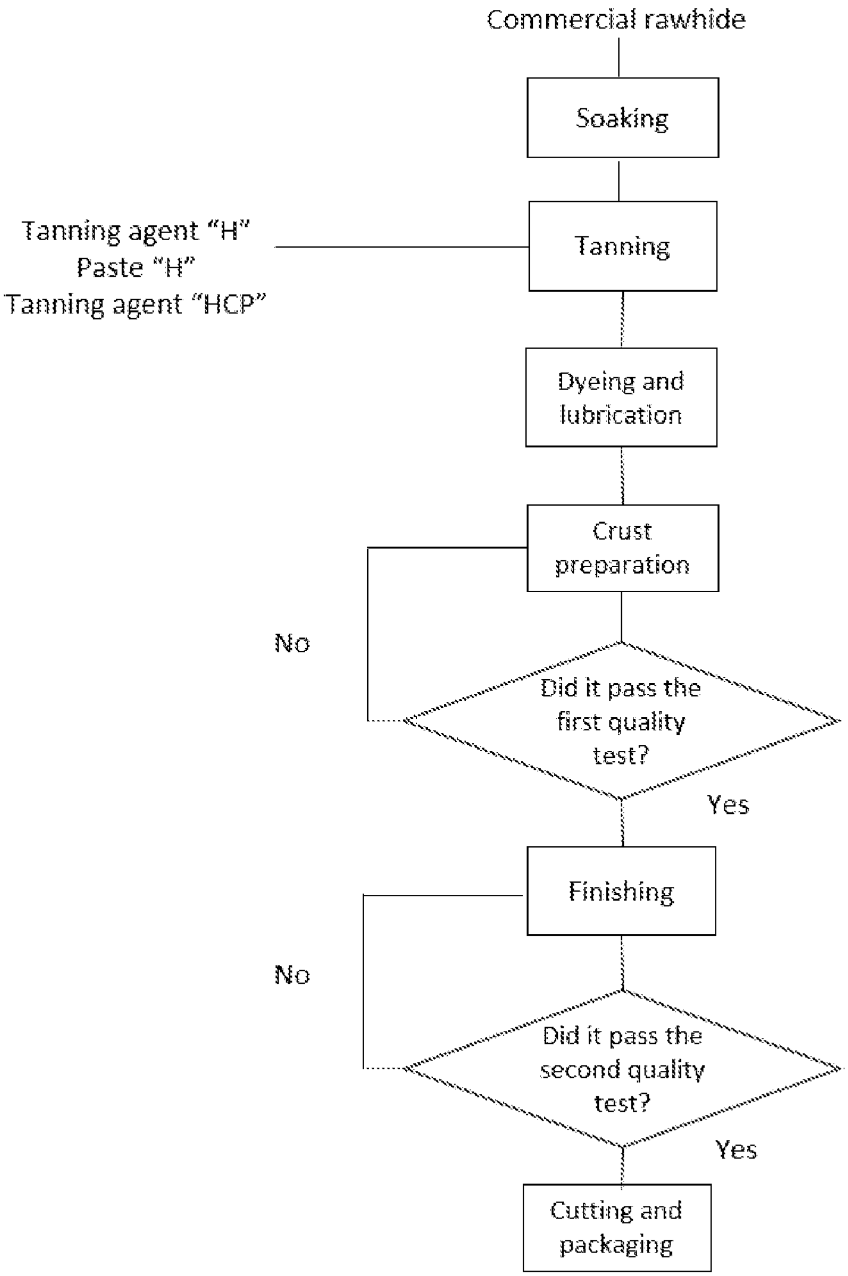
FIG. 2 comprises a block diagram depicting the stages of the method for producing sustainable leather using by-products from parts of all varieties and species of the genus *Persea* plant of the present invention.

Leather Production (FIG. 2)

The raw leather is processed by a method comprising the following steps:

a) Soaking: commercial rawhide or hairless hides (leather) are placed in a rotating cylindrical reactor and immersed in water in an amount of 1000% by weight water base at a temperature between 15 and 45 degrees Celsius and left to stand (without movement) for a period of time of between 10 to 12 hours; the reactor is subsequently spun at a speed of 2 to 12 revolutions per minute for a time period of approximately 30 minutes after which the bath is drained;

b) Tanning: 100% to 150% water is added (based on the weight of the wet leather) to the rotating reactor containing the soaked leather at a temperature of 20 to 60 degrees Celsius and the following vegetable ingredients are added: tanning agent H, paste H and HCP tanning agent in an amount of 3 to 25% of each (percentage based on the weight of the hides) and attached to the collagen fibers by turning the reactor at a speed of 2 to 14 revolutions per minute for 1 to 48 hours.

c) Dyeing and lubrication: the tanned leather (hide) is introduced into a dyeing reactor and 10 to 30% by weight of AL50 OIL is added, 0.3 to 12% of dye (according to the desired shade) and 100 to 300% of water at a temperature of 40 to 60 degrees Celsius. The reactor is then rotated for a time period of 2 to 6 hours at a speed of 6 to 12 revolutions per minute, after which 1 to 6% formic acid is added at 85+/−0.5%, continuing to rotate the reactor for an additional time period of 1 to 3 hours to achieve fixation of the complete list of added products;

d) Crust preparation: the leather is removed from the reactor from stage c), squeezed in draining machines with absorbent felts and hung in the open air to dry at room temperature. The leather is then brought down (removed from the place where it is hung, concluding the air-drying process) when they have a relative humidity of 8 to 15% and are softened in a stainless-steel reactor rotating at a speed of 2 to 14 revolutions per minute for 1 to 24 hours. Leather moisture is measured by means of a Leather relative moisture meter. It should be understood that any other known means or machine can be used to perform skin draining;

e) First quality test: the following parameters of the leather produced in step d) are tested: thickness, stiffness (cantilever method), stretch and set, breaking strength, tear resistance. If the leather meets the parameter values listed in Table 1, then the leather is approved to proceed to the next step, if the leather does not pass the first quality test, it is sent back to step d);

f) Finish: conventional paint is applied to the leather by means of air sprayers or pressure rollers, typically a mixture of 50%+−15% water and 50%+−15% polyurethane and acrylic resins;

g) Second quality test: the following parameters are tested on the leather produced in step f): smoothness, resistance to scratching, rubbing, color fastness and wear (water/500, windex/100, ethyl alcohol 70/30%/100, tanning lotion/100, alkaline sweat/100), wear of the outermost coat, bally flexing, flammability, color, and gloss. If the leather meets the values of the parameters listed in Table 1, then the leather is approved to proceed to the next step, otherwise the leather is rejected.

h) Cutting and packaging: the finished leather is measured on machines that read the surface by means of photocells. The leather is cut with hydraulic presses and cutting tools and, finally, the packaging of the leather is carried out in paper-wrapped rolls or in cardboard boxes.

TABLE 1

| Required parameters first quality test and second quality test | | | |
|---|---|---|---|
| Test Requirements | Specification | Optimal result | |
| Thickness | 1.0-1.50 mm | Back = 1.29 mm<br>Front = 1.26 mm | |
| Stiffness (cantilever method) | 40-90 mm | Back = 63.5 mm<br>Front = 60.0 mm | |
| Stretch and Set | 25% max, stretching<br>10% max, Setting | Back = 12.0%<br>Front = 14.5%<br>Back = 2.0%<br>Front = 3.0%. | |
| Smoothness | 2.5-5.5 mm | 3.85 mm | |
| Flexion (Bally flex) | Original (100.00 Cycles) | Back = Satisfactory<br>Front = Satisfactory | |
| Breaking strength | 400N minimum | Back = 724N<br>Front = 687N | |
| Tear resistance | 70N minimum | Back = 338N<br>Front = 281N | |
| Scratch resistance | No advancement or cracks in the coating after 200 cycles, Head A | Back = Satisfactory<br>Front = Satisfactory | |
| | | Leather | Feeling |
| Rubbing, color fastness and wear (water/500, windex/100, ethyl alcohol 70/30%/100, suntan lotion/100, alkaline sweat/100) | Rating of 4 minimum | Grade5<br>Grade5<br>Grade 4-5<br>Grade5<br>Grade5 | Grade 4.5<br>Grade 4.5<br>Grade 4<br>Grade4.5<br>Grade4.5 |
| Outermost Coat wear | 5 minutes and time report of wear and tear to reddish (89N load) | Back = Satisfactory 15<br>Front = Satisfactory 15 | |
| Flammability | Burning rate 100 mm/minute maximum | Self-extinguishing | |
| Color | DE* < 1.0 | DE* 0-244 | |
| Brightness | Brightness = 1.2-2.0UB | 1.65 UB | |

The parameters of the leathers measured in the first quality test and in the second quality test are measured according to the standards in Table 2:

TABLE 2

| standards used for the measurement of the parameters required in the first quality test and in the second quality test. | |
|---|---|
| Parameter | Standard under which it is measured |
| Thickness | ASTM D1813 |
| Stiffness (cantilever method) | ASTM D1388-18 |
| Stretch & set | SAE J855 November 2009 |
| Smoothness | ISO 17235 IULTCS/IUP 36 |
| Flexion (Bally flex) | ASTM D6182-00 (Reapproved 2015) |
| Breaking strength | ASTM D2208 |
| Tear resistance | ASTM D5587 |
| Scratch resistance | SAE J365 May 2012 |
| Rubbing, color fastness and wear (water, windex, ethyl alcohol, suntan lotion, alkaline sweat) | ISO 11640 IULTCS/IUF 450 |
| Wear of the outermost coat | Ford Laboratory Test Method BN 108-14 |
| Flammability | ISO 3795 |
| Color | FLTM BI 109-02 |
| Brightness | FLTM BI 110-01 |

In another embodiment of step b) pertaining to the leather production steps, the following vegetable ingredients: tanning agent H, paste H and HCP tanning agent are added not independently, but as a mixture of natural ingredients previously mixed by stirring for 5 to 30 minutes in the following percentages (+/−15% to obtain a total of 100%):

Tanning agent H: 33.3%+−15%.

Paste H: 33.3%+−15%.

HCP Tanning Agent: 33.3%+-15%.

In this approach, the amount of the mixture to be added in step b) is between 3% and 25% depending on the required strength and softness properties.

Analysis of the Leather Produced by the Method of the Present Invention.

The analysis of the chemical components of the leather produced by the method of the present invention was carried out by Fourier transform infrared spectroscopy (FT-IR). This technique is based on molecular vibration, making it very useful for the analysis of compounds of natural origin; A comparative analysis of conventional leather samples compared with leather produced with the method of the present invention, shows a remarkable difference: the method of the present invention generates in the leather the following peaks in the infrared curves, which are intrinsic only in leather tanned with plant derivatives of the genus *Persea*:

| Frequency (cm −1) | % Transmittance |
|---|---|
| 3700-3750 | 90% |
| 2913-2960 | 54% |
| 1720-1750 | 90% |
| 1530-1560 | 72% |
| 1450-1470 | 64% |
| 1080-1095 | 65% |

The data shown in the above table comprise a “chemical identity card” which is useful for identifying the leather produced by the method of the present invention.

Ideally, the analysis of the chemical components of the leather produced by the method of the present invention is carried out using a Fourier Transform Infrared Spectrophotometer (FT-IRJ) (Thermo Scientific Nicolet Model iS10) with a MIR source and with the SmartOrbit ATR/Avatar module. The software used is OMNIC 8.2 (Thermo Scientific), analyzing spectra obtained in the infrared region between 4000 cm−1 and 400 cm−1.

Example 1) 50 Leathers

Example 2) 100 Leathers

Forty kilograms of *Persea* fruit at various stages of maturation and 40 kg of seeds were received. They were left to stabilize for 24 hours at an ambient temperature that fluctuated between 24 and 26 degrees.

Subsequently, the “tanning agent H” was elaborated.

a) 40 kg of avocado seeds of the *Persea* genus at various stages of ripening were crushed.

b) The seeds of avocado trees of the *Persea* genus obtained from stage a), in a proportion of 24.9% of seeds, and 75.1% of water (percentages in base weight), c) the product from step b) was heated at a temperature of 60° C. for 22 minutes;

d) the product from step c) was filtered through rapid filtration filters with a sieve size of 100 microns to obtain: 120 liters of a filtered liquid called “tanning agent H” which has an orange color, and which is derived from the seed of avocado trees genus “*Persea*”; this solution was used for the tanning run of 50 hides using 11.904 kilograms and for the run of 100 hides 19.600 kilograms were used. The solid resulting from the filtration process is called Paste H, which was used in the two examples of production runs; 11.904 kilograms were used for the production of 50 hides and 19.600 kilograms for the production of 100 hides. Subsequently, the HCP tanning agent was elaborated. Forty kilograms of *Persea* fruit were received at various stages of maturation. They were left to stabilize for 24 hours at an ambient temperature that fluctuated between 24 and 26 degrees Celsius.

a) The seed, pulp, and peel of 40 kg of *Persea* avocados at various stages of maturation were crushed, b) The crushed seed, pulp, and peel of *Persea* avocados obtained in step a) were soaked in a proportion of 24.7% of the crushed seed, pulp, and peel and 75.3% of water.

c) The product obtained from step b) was heated at a temperature of 62° C. for a period of 21 minutes;

d) The product from step c) was filtered through rapid filtration filters with a sieve mesh size of 100 microns to obtain: 120 liters of a filtered liquid called "HCP tanning agent" which is derived from the seed, pulp, and peel of avocados of the genus "*Persea*"; this solution was used in two examples of production runs 11.904 kilograms for the tanning of 50 hides and 19.600 kilograms for 100 hides.

The tanning process was carried out for the 50 hides with these ingredients by adding 298 liters of water at a temperature of 45 degrees Celsius for a time of 2.8 hours in a reactor with a speed of 6 revolutions per minute and for the 100 hides by adding 490 liters of water at a temperature of 45 degrees Celsius for a time of 2 hours in a reactor with a speed of 6 revolutions per minute.

Subsequently, the ingredient AL50 OIL was manufactured with 24 kilograms of 100% pure *Persea* oil in 95 liters of water at 50 degrees Celsius and 5 kilograms of anionic emulsifier, stirring for 15 minutes. Of this emulsion, 41.060 kilograms were used for example 1 of 30 50 hides and 63,210 for example 2 of 100 hides.

Dyeing Process.

The 50 hides were dyed with 0.830 kilograms of beige dye in a bath of 298 liters of water at a temperature of 45 degrees Celsius in a reactor of 6 revolutions per minute for 1 hour using 5.060 kilograms of formic acid as a fixing ingredient.

The 100 hides were dyed with 22.050 kilograms of black dye in a bath of 490 liters of water at a temperature of 45 degrees Celsius in a reactor of 6 revolutions per minute for a period of 1 hour using 11.025 kilograms of formic acid as a fixing ingredient.

Both examples were produced under the conventional drying, softening, and finishing system described above.

Analysis of the hides obtained by Fourier transform infrared spectroscopy (FT-IR) showed that they comply with the "chemical identity card" described above.

The invention claimed is:

1. A method for the preparation of a natural tanning agent for use in tanning processes of hides and skins, obtained from avocado of the genus *Persea* in any variety of species, comprising the next stages:

(a) crushing the seeds of the *Persea* genus plant avocados at any stage of maturation, until a particle size equal to or less than 5 mm is obtained;

(b) soaking the crushed seeds, pulp, and peel of avocados of the plant of the *Persea* genus obtained in stage a), in a proportion of 10 to 30% of seeds and 70 to 90% of water (percentages in base weight);

(c) heating the product from step b) at a temperature between 60 and 100° C. for a time between 15 minutes and up to 12 hours;

(d) filtering the product from step c) through rapid filtration filters having a sieve mesh size between 100 to 500 microns to obtain: a filtered liquid which is derived from the seeds of avocados of the genus "*Persea*" and comprising a first component of the natural tanning agent;

(e) recovering a paste which is the solid resulting from the filtering operation d) derived solely from the seeds of avocados of the genus *Persea* and comprising a second component of the natural tanning agent;

(f) grinding the seeds, pulp, and peel of whole avocados of the genus *Persea* without having the degree of maturation required by the food industry;

(g) soaking the ground seeds, pulp, and peel of *Persea Americana* avocados obtained in step f), in a proportion of 10 to 30% of the ground seeds, pulp and peel and 70 to 90% of water (percentages in base weight);

(h) heating the product from step g) at a temperature between 60 and 100° C. for a period of time between 15 minutes and up to 12 hours;

(i) filtering the product from step h) by means of rapid filtration filters having a sieve mesh size of between 100 to 500 microns to obtain: a filtered liquid derived from the seeds, pulp, and peel of the whole avocados of the genus "*Persea*" without having the degree of maturation required by the food industry and comprising a third component of the natural tanning agent;

(j) mixing the first component, second component and third component of the natural tanning agent in a proportion of 33.3% (+/−15% to obtain a total of 100%) of each, to obtain the natural tanning agent.

2. The method for the preparation of a natural tanning agent according to claim 1, wherein comprising the additional step of: mixing under stiffing from 5% to 50% in weight of 100% pure *Persea* plant oil with water and at least one anionic type of emulsifier at a temperature of 40 to 80 degrees Celsius (base weight percentages) to produce an oil comprising a natural tanning agent.

3. A natural tanning agent for use in leather tanning processes and hides, obtained from avocado of the genus *Persea* in any variety of species obtained by the method of claim 1.

4. The natural tanning agent for use in the tanning process of hides and leathers, obtained from avocado of the genus *Persea* in any variety of species obtained by the method of claim 2.

5. A method for the tanning of raw hides and skins of cattle, goats and other livestock of all ages and various breeds comprising the general stages of soaking of raw hides or skins, tanning, dyeing, and lubrication, preparation of the crust, finishing and packaging, wherein using natural tanning agents derived from avocados of the genus *Persea* in any variety of species, wherein the method comprises the following steps that are executed at any time prior to starting with the dyeing and lubrication stage:

(a) crushing the seed of avocados of the *Persea* genus plant at any stage of maturation;

(b) soaking the crushed seed of avocados of the genus *Persea* obtained in step a), in a proportion of 10 to 30% of seeds and 70 to 90% water (percentages in base weight);

(c) heating the product from step b) at a temperature between 60 and 100° C. for a period of time between 15 minutes and up to 12 hours;

(d) filtering the product from step c) by means of rapid filtration filters having a sieve mesh size of between 100 to 500 microns to obtain: a filtered liquid which is derived from the seeds of avocados of the genus "*Persea*", and which comprises a first natural tanning agent;

(e) recovering a paste which is the solid resulting from the filtering operation from step d) derived solely from the seeds of the avocado genus *Persea* and comprising a second natural tanning agent;

(f) grinding the seeds, pulp, and peel of all avocados of the *Persea* genus without having the degree of maturation required by the food industry;

(g) soaking the ground seeds, pulp, and peel of *Persea* avocados obtained in step f), in a proportion of 10 to 30% of the ground seeds, pulp and peel and 70 to 90% of water (percentages in base weight);

(h) heating the product from step g) at a temperature between 60 and 100° C. for a period of time between 15 minutes and up to 12 hours;

(i) filtering the product from step h) by means of rapid filtration filters which have a sieve mesh size of between 100 and 500 microns to obtain: the filtered liquid derived from the seeds, pulp, and peel of the whole "*Persea*" avocados without the degree of maturation required by the food industry and comprising a third natural tanning agent;

wherein the tanning stage comprises:

adding from 100% to 150% water to a reactor containing leather soaked in the soaking stage (percentage based on the weight of the hides) at a temperature from 20 to 60 degrees Celsius and the first natural tanning agent, the second natural tanning agent and the third natural tanning agent are added in an amount of 3 to 25% of each (percentage based on the weight of the hides) and are attached to the collagen fibers by spinning the reactor at a rate of 2 to 14 revolutions per minute for a period time from 1 to 48 hours.

6. The method for tanning raw hides and skins according to claim 5, wherein:

the next stage is carried out at any time prior to the dyeing and lubrication stage:

mixing under stiffing 5% to 50% by weight of 100% pure *Persea* plant oil with water and emulsifiers at a temperature of 40 to 80 degrees Celsius (base weight percentages) to produce an oil comprising a fourth natural tanning agent;

the dyeing and lubrication stage comprises:

introducing the leather tanned in the preceding tanning stage into a dyeing reactor and adding 10 to 30% of the fourth natural tanning agent, 0.3 to 12% dye (according to the desired shading) and 100 to 300% of water at a temperature of 40 to 60 degrees Celsius;

subsequently, the reactor is rotated for a period of time of 2 to 6 hours at a speed of 6 to 12 revolutions per minute, after which 1 to 6% formic acid is added at 85+/−0.5%, continuing the rotation of the reactor for an additional period of time of 1 to 3 hours to achieve complete fixation of the added products.

7. The method for the tanning of raw hides and skins in accordance with claim 5, wherein:

the following step is carried out at any time before the dyeing and lubrication step:

mixing 5% to 50% by weight of 100% pure *Persea* plant oil with water and emulsifiers under stirring at a temperature of 40 to 80 degrees Celsius (percentages by weight basis) to produce an oil comprising a fourth natural tanning agent;

the dyeing and lubrication stage comprises:

introducing the leather tanned in the previous tanning stage into a dyeing reactor and adding from 10 to 30% of the fourth natural tanning agent, from 0.3 to 12% of dye (according to the desired shading) and 100 to 300% of water at a temperature of 40 to 60 degrees Celsius;

subsequently, the reactor is rotated for a period of time of 2 to 6 hours at a speed of 6 to 12 revolutions per minute, after which 1 to 6% formic acid is added at 85+/−0.5%, continuing the rotation of the reactor for an additional period of time of 1 to 3 hours to achieve complete fixation of the added products;

the crust preparation stage includes:

squeezing the dyed and lubricated leather and drying it at room temperature until it reaches a relative humidity of 8 to 15% and then softening it in a stainless-steel reactor rotating at a speed of 2 to 14 revolutions per minute for 1 to 24 hours;

a first quality test is performed in which the leather must meet the following parameters in order to pass to the finishing stage: thickness: 1.0 to 1.50 mm, rigidity (cantilever method): 40 to 90 mm; stretch and set: stretch 25% maximum, set 10% maximum, breaking strength: 400 N minimum, tear strength: 70 N minimum; in case the leather does not meet these requirements, it is again subjected to the crust preparation stage;

the finishing stage involves applying conventional paint on the leather by means of air sprayers or pressure rollers, typically a mixture of 50%+/−15% water and 50%+/−15% polyurethane and acrylic resins;

the leather coming from the finishing stage is subjected to a second quality test where the leather has to comply with the following parameters: softness: 2.5 mm to 5.5 mm; scratch resistance: no coating breakthrough or cracking after 200 cycles; rubbing, color fastness and wear (water/500, windex/100, ethyl alcohol 70/30%/100, suntan lotion/100, alkaline sweat/100,): rating of 4 minimum; outermost coat wear: 5 minutes and report wear time to reddish (89 N load); flammability (both sides): burning speed: 100 mm/minute maximum; Color: DE*<1.0; brightness: 1.2 to 2.0 UB; original bally flexing (100,00 cycles); if the leather meets the indicated parameter values then the leather is approved to continue to the final packaging stage.

8. A hide or skin produced by the method of claim 5, which exhibits the following peaks in the infrared curves, which are intrinsic only to leather tanned with derivatives of the *Persea Americana* plant:

| Frequency (cm −1) | % Transmittance |
|---|---|
| 3700-3750 | 90% |
| 2913-2960 | 54% |
| 1720-1750 | 90% |
| 1530-1560 | 72% |
| 1450-1470 | 64% |
| 1080-1095 | 65% |

wherein the above data were obtained by analyzing the chemical constituents of the leather produced using a Fourier Transform Infrared Spectrophotometer (FT- IRJ) (Thermo Scientific Model Nicolet iS10) with a MIR source and the SmartOrbit ATR/Avatar module, The software used is OMNIC 8.2 (Thermo Scientific), analyzing the spectra obtained in the infrared region between 4000 cm−1 and 400 cm−1.

9. The method for the preparation of a natural tanning agent according to claim 1, wherein comprising the additional step of: mixing under stirring from 5% to 50% in weight of 100% pure *Persea* plant oil with water and at least one anionic type of emulsifier at a temperature of 40 to 80 degrees Celsius (base weight percentages) to produce an oil comprising a natural tanning agent for a period of between 5 and 30 minutes.

10. The method for the preparation of a natural tanning agent according to claim 1, wherein comprising the additional step of: mixing under stirring 25% by weight of 100% pure *Persea* plant oil with water and at least one anionic type of emulsifier at a temperature of 40 to 80 degrees Celsius (base weight percentages) to produce an oil comprising a natural tanning agent.

11. The method for the preparation of a natural tanning agent according to claim 1, wherein comprising the additional step of: mixing under stirring 25% by weight of 100% pure *Persea* plant oil with water and at least one anionic type of emulsifier at a temperature of 40 to 80 degrees Celsius (base weight percentages) to produce an oil comprising a natural tanning agent for a period of between 5 and 30 minutes.

12. The method for tanning raw hides and skins according to claim 5, wherein:

the next stage is carried out at any time prior to the dyeing and lubrication stage:

mixing under stiffing 25% by weight of 100% pure *Persea* plant oil with water and emulsifiers at a temperature of 40 to 80 degrees Celsius (base weight percentages) to produce an oil comprising a fourth natural tanning agent;

the dyeing and lubrication stage comprises:

introducing the leather tanned in the preceding tanning stage into a dyeing reactor and adding 10 to 30% of the fourth natural tanning agent, 0.3 to 12% dye (according to the desired shading) and 100 to 300% of water at a temperature of 40 to 60 degrees Celsius;

subsequently, the reactor is rotated for a period of time of 2 to 6 hours at a speed of 6 to 12 revolutions per minute, after which 1 to 6% formic acid is added at 85+/−0.5%, continuing the rotation of the reactor for an additional period of time of 1 to 3 hours to achieve complete fixation of the added products.

13. The method for the tanning of raw hides and skins in accordance with claim 5, wherein:

the following step is carried out at any time before the dyeing and lubrication step:

mixing 25% by weight of 100% pure *Persea* plant oil with water and emulsifiers under stirring at a temperature of 40 to 80 degrees Celsius (percentages by weight basis) to produce an oil comprising a fourth natural tanning agent;

the dyeing and lubrication stage comprises:

introducing the leather tanned in the previous tanning stage into a dyeing reactor and adding from 10 to 30% of the fourth natural tanning agent, from 0.3 to 12% of dye (according to the desired shading) and 100 to 300% of water at a temperature of 40 to 60 degrees Celsius;

subsequently, the reactor is rotated for a period of time of 2 to 6 hours at a speed of 6 to 12 revolutions per minute, after which 1 to 6% formic acid is added at 85+/−0.5%, continuing the rotation of the reactor for an additional period of time of 1 to 3 hours to achieve complete fixation of the added products;

the crust preparation stage includes:

squeezing the dyed and lubricated leather and drying it at room temperature until it reaches a relative humidity of 8 to 15% and then softening it in a stainless-steel reactor rotating at a speed of 2 to 14 revolutions per minute for 1 to 24 hours;

a first quality test is performed in which the leather must meet the following parameters in order to pass to the finishing stage: thickness: 1.0 to 1.50 mm, rigidity (cantilever method): 40 to 90 mm; stretch and set: stretch 25% maximum, set 10% maximum, breaking strength: 400 N minimum, tear strength: 70 N minimum; in case the leather does not meet these requirements, it is again subjected to the crust preparation stage;

the finishing stage involves applying conventional paint on the leather by means of air sprayers or pressure rollers, typically a mixture of 50%+/−15% water and 50%+/−15% polyurethane and acrylic resins;

the leather coming from the finishing stage is subjected to a second quality test where the leather has to comply with the following parameters: softness: 2.5 mm to 5.5 mm; scratch resistance: no coating breakthrough or cracking after 200 cycles; rubbing, color fastness and wear (water/500, windex/100, ethyl alcohol 70/30%/100, suntan lotion/100, alkaline sweat/100,): rating of 4 minimum; outermost coat wear: 5 minutes and report wear time to reddish (89 N load); flammability (both sides): burning speed: 100 mm/minute maximum; Color: DE*<1.0; brightness: 1.2 to 2.0 UB; original bally flexing (100,00 cycles); if the leather meets the indicated parameter values then the leather is approved to continue to the final packaging stage.

* * * * *